Figure 1:
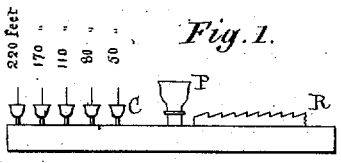

2 Sheets--Sheet 1.

CHARLES GRAFTON PAGE.

Improvement in Induction Coil Apparatus and Curcuit Breakers.

No. 4,588. Reissued Oct. 10, 1871.

Witnesses.

C. B. Nottingham.

Jno. P. Patten.

Inventor.

Priscilla Webster Page
Administratrix of the estate of
Charles Grafton Page
deceased
By A. Pollok
her attorney.

2 Sheets--Sheet 2.

CHARLES GRAFTON PAGE.

Improvement in Induction Coil Apparatus and Curcuit Breakers.

No. 4,588. Reissued Oct. 10, 1871.

Witnesses

C. B. Nottingham.

Jno. D. Patten

Inventor

Priscilla Webster Page
Administratrix of the estate of
Charles Grafton Page
deceased
by A. Pollok her attorney.

UNITED STATES PATENT OFFICE.

PRISCILLA WEBSTER PAGE, OF WASHINGTON, DISTRICT OF COLUMBIA, (ADMINISTRATRIX OF THE ESTATE OF CHARLES GRAFTON PAGE, DECEASED,) ASSIGNOR OF ONE-HALF OF HIS RIGHT TO THE WESTERN UNION TELEGRAPH COMPANY, OF NEW YORK, N. Y.

IMPROVEMENT IN INDUCTION-COIL APPARATUS AND CIRCUIT-BREAKERS.

Specification forming part of Letters Patent No. 76,654, dated April 14, 1868; Reissue No. 4,588, dated October 10, 1871.

*To all whom it may concern:*

Be it known that CHARLES GRAFTON PAGE, late of Washington, in the District of Columbia, now deceased, did invent certain new and useful Improvements in Induction-Coil Apparatus and Circuit-Breakers, and the following is declared to be a full, clear, and exact description of the same, reference being had to the accompanying drawings.

The induction-coil consists of a metallic conductor (copper is generally preferred) in the form of wire, round or otherwise, or a flat strip of metal coiled up in the form of a helix-reel, or "bobbin," as it is sometimes called, or in the form of a flat spiral, the helix or bobbin or spiral usually having a central or core opening in its axis to admit of the introduction of a bar of iron, or bundle of iron wires, or other form of iron.

The wire or strip of metal is covered with cotton, silk, or some insulating substance, or some insulating material is introduced between each turn of the wire, or sometimes the wires are merely spaced—that is, each turn separated by a small interval and an insulating substance placed between each layer. This wire or strip may be of the same size throughout its length; or, in the case of wires, two wires may be used, one of greater diameter than the other and of much less length; or, in the case of strips, one strip may be thinner and longer than the other. When the wire or strip is continuous throughout, and its entire length is included in a galvanic circuit, it is called a simple primary coil or circuit. When the galvanic current passes through such primary coil or circuit a momentary current of induction is set up in the wire or strip contrary to the direction of the galvanic current, and causes resistance to it. This current is called the initial secondary current.

When the galvanic current is arrested in the wire or strip another momentary current of induction is set up in the wire, having the same direction as the galvanic current.

If the battery-current be strong, and the wire or strip of considerable length, when both ends of the wire are grasped, one in each hand, an electric shock is felt at the moment the galvanic current is arrested in the wire, and the strength of the shock bears some proportion to the strength of the galvanic current and the length, size, and insulation of the wire. This current is called the "terminal secondary," but generally the "extra current," and the shock is an electrostatic effect, indicating a current of higher intensity than that of the battery which produced it.

Figure 1 represents a vertical section through the middle of a flat spiral of copper ribbon coiled in the manner of a watch-spring, with varnished silk, cotton, or paper between each turn of the spiral. It is inclosed in a box, and has a metallic stem connected with the central end of the ribbon, rising through the cover of the box and supporting a large cup, P, designed to hold mercury. This cup is best made of glass, so as to exhibit the induction sparks to advantage, which are produced each time the battery-circuit is broken at the surface of the mercury.

The spiral has several smaller cups, *c*, attached to metallic stems connected with various parts of the spiral at different distances from its center.

By placing one pole of the battery in connection with the central cup, P, and the other pole in connection with the other cups, *c*, successively, the shocks and other electrostatic effects will be found to increase the farther from the center of the coil the connection is formed, whenever said connection is broken.

The battery-current may be passed through the part included between *c* and P, and the shocks and electrostatic effects derived from the whole coil or any portion thereof, including the part conveying the battery-circuit or not.

When the portion of the coil is outside of or extraneous to the battery-circuit, as the part between the cup *c*, next the central cup, and the cup connected with the outer extremity of the spiral, or any portion included between such middle and outer cup, then this portion is called the "pure secondary circuit," whether it be independent or metallically connected with the primary circuit. It will be found more economical of space, and more advantageous in regard to the power and intensity of the secondary circuit, to make it of much thinner metallic ribbon than the primary circuit.

R represents a rasp circuit-breaker, consisting of a coarse rasp of metal, to be connected with the central cup, and then the circuit may be broken with rapidity by drawing the pole of the battery over this rasp, which also makes part of the main circuit. The mechanical circuit-breakers, such as the spur-wheels, are used with efficiency with the primary in this case.

The mechanical circuit-breakers are so well understood, and now so generally in disuse, that it is not necessary to describe them more particularly. The representation of the rasp R is the type of them all. Thus this instrument has within itself the means of graduating the power of the shocks without changing the force of the battery-current. It is, however, generally preferred, for simplicity, to have but two circuits, viz., a primary and one secondary circuit, regulating the shocks by other means, and to make the primary of coarse wire, usually of copper, choosing such size as may be suited to the intended size of the coil, using from No. 20 wire up to No. 10, or even larger, the larger sizes being used for large coils.

Figure 2:
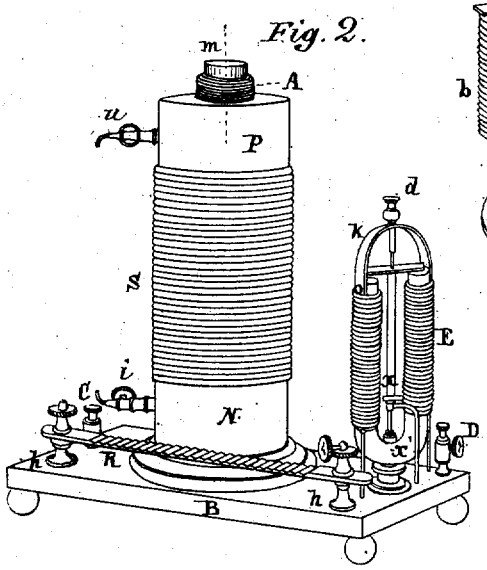

The wire is insulated, as before-mentioned, and usually wound in a coil or helix on two, three, or four superposed layers, leaving a core-space in the axis, as before described. This is shown in Fig. 2, where A represents the coil fixed to a stand. This coil has three or four layers of wire, and the opposite ends of the wires pass down through the base-board B, and are connected, respectively, underneath the board, to the binding-screw cups C D.

The inclosed electro-magnet *m* is seen projecting above the coil, and is composed of a bundle of soft-iron wires separated from the primary coil by a layer of some insulating material, such as varnished cotton, or silk, or oiled silk, or any known insulator that is applicable. If the wires are clean and bright it is best to varnish them. Exterior to the primary is the secondary coil S. This coil is made of fine wire, from a thirtieth to a hundredth of an inch in diameter, and of great length as compared with the primary coil. At first they were made of one to three thousand feet, but at the present day secondary coils are made sometimes of the immense length of fifty to eighty miles and upward.

It is important to insulate very carefully the individual spires or turns of the secondary wires by varnishing with a solution of shellac, and also to separate each layer from the next by a thick coating of shellac or layers of oiled silk, or varnished paper, cotton, or other suitable insulating material. This careful insulation is of importance in proportion to the power and size of the coil. For small coils it may be neglected to a great extent, and a very energetic coil may be made, when of small size—say three inches in length—by using silk-covered wire without varnish, using only oiled silk or varnished paper between each layer, or even a good coating of shellac-varnish between each layer, in which case cotton-covered wire may be used. The wire may be of iron or copper, the latter being preferable in most cases.

The secondary coil in Fig. 2 is provided with caps P N, made of metal or wood, the latter or some insulating substance being preferable, and the extremities of the wire of the coil are connected with the binding-screw cups *u i* inserted in or attached to these caps. The secondary coil is also well insulated from the primary coil by intervening layers of insulating material.

The rasp circuit-breaker R consists of a bar of brass, iron, or other metal having a coarsely-serrated surface, and suspended upon the short pillars *h h*.

Mounted on one end of the stand is an automatic circuit-breaker. It consists of a small electro-magnet, E, for the coil, of which only a few feet of insulated wire are required, and the extremities of this wire pass down through the base-board, as shown in the drawings, and are connected underneath with circuit-wires.

The armature *a* of the magnet is attached to a revolving shaft, *e*, which has its lower bearing on the bend of the magnet and its upper bearing in the adjustable pivot-screw *d*, supported in the frame or yoke K, connected with the poles of the magnet.

Figure 3:
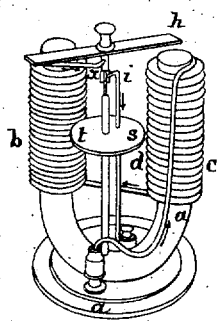

Two light spring-wires, *x x'*, bear upon the shaft *e*. The upper one, *x*, bears upon a cylindrical part of the shaft, and *x'* upon what is called the "cut-off," consisting of two projections of metal from opposite sides of the shaft. The operation of this cut-off and circuit-breaker is best understood by reference to a detached view of the instrument in Fig. 3, where the cut-off is a cylindrical piece or ferrule of metal slipped over the shaft, the upper portion of it being entire, for the bearing of the upper spring, *x*, and the lower portion being dissected, having two metallic portions projecting on opposite sides, and the intervening portions filled up with wood, ivory, or some non-conducting material. One extremity of the wire coil is shown in connection with binding-screw cup *a*, and the lower end of spring *i* is in connection with screw-cup *e*.

The spindle or shaft of the armature *h* revolves within a tubular socket or bearing, *t*, supported upon the wooden or ivory disk *b*, supported between the branches of the electro-magnet. Spring *i* passes through and is also supported by this disk or brace.

If now one pole of a galvanic battery is connected with cup *a*, and the other pole with cup *e*, and the spring *i* resting upon the metallic division of the cut-off, the galvanic circuit will be complete throughout.

The current, as indicated by the arrows, will pass up the wire-connection *a* of the coil or branch *e*, and, circulating downward through this coil, will pass across to the coil or branch *b*, through connecting-wire *d*, and circulating upward through this coil, will pass outward through the wire spring *x*, which terminates the upper end of this coil, into the whole portion of the cut-off on the shaft of the armature, thence, through the projecting or sectional portion, into spring *i*, thence downward to cup *l*, and so back to the battery. The effect of this passage of the current will be to charge the electro-magnet, which will attract the armature so as to bring its ends directly over the poles of the magnet. Just before it reaches this position the spring *i* has passed out of metallic connection with the cut-off, by leaving the metallic projection, and the galvanic current being thus interrupted the magnetism ceases and allows the armature to swing round by its momentum a little more than a half-circle, and the opposite projection, coming against the spring *i*, again establishes the circuit.

The movement of the armature is repeated, and each time with renewed impulse, until it gets into very rapid motion, thus breaking and renewing the circuit automatically. Now, if the circuit of this instrument is made part of the circuit of the primary coil, it is evident that its circuit will be broken rapidly, and at each break a shock will be felt upon touching the extremities of the secondary coil S. If the ends of the wires connected with the cups of coil S are brought near to each other sparks will pass between them at each rupture of the primary circuit, and a Leyden jar may be charged by them, one of the wires connected with the knob of the jar being insulated from the hand, and shocks may be received from the Leyden jar. Other electrostatic phenomena may be exhibited by the induced current from the secondary coil, and sparks and other indications obtained, even from one end of its wire, if it be insulated.

In order to operate the rasp or mechanical circuit-breaker, it must be connected with one end of the circuit of the primary coil, and a wire connected with the other end of the circuit, held in the hand, is drawn over its teeth, each tooth operating as a circuit-breaker, and shocks and other indications may be taken from the secondary circuit, as before. Instead of the straight rasp, a spur, rag, or cog, or sprocket wheel may be used, and turned by hand or otherwise; and in this case the terminal wire, which was held in the hand, is fixed to the base-board, and so as to press upon the periphery of the spur-wheel.

It will be found, generally, that the harder the pressure upon the rasps or wheels with the wire the stronger the indications from the secondary circuit, and that a certain degree of rapidity is necessary to insure the maximum effect. If the interruptions are too frequent the shocks may be diminished, as the coil and magnet do not get time to receive a full charge from the battery between the interruptions. The maximum rate of interruption is to be determined in each case by experiment. As a general rule, the larger the instrument or coils the slower must be the rate of interruption.

Figure 4:
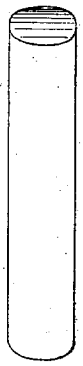
Figure 5:
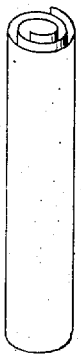
Figure 6:
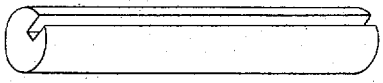
Figure 7:
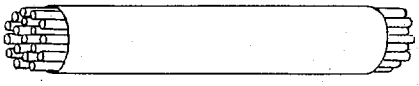

Instead of a bundle of iron wires placed in the axis of the coil, the magnet may consist of thin plates, as shown in Fig. 4, and the plates may be made to adhere by varnish between them; or a piece of thin sheet-iron, rolled up into a scroll, as shown in Fig. 5, may be used, the surface of the iron being covered with varnish; or a bar of iron divided by a longitudinal furrow or groove down to its axis, as shown in Fig. 6, may be used. The bundle of wires is, however, the preferable form, as shown in Fig. 7, the bundle or "fasciculus," as it is sometimes called, being bound or wrapped with some non-conducting material. This species of magnet the said CHARLES G. PAGE called the "compound or divided electro-magnet."

The bundle may sometimes be left movable in and out from the coil, as its movements or degree of insertion in the coil regulates the force of the shock and the development of the electrostatic properties of the secondary circuit. In the case of the remedial application of the instrument this mode of regulation is very convenient.

The secondary coil may also be made movable longitudinally, or in the direction of its axis, and this movement will also regulate the force of the secondary current. If the secondary coil be made shorter in the direction of its axis than the primary, it will furnish more powerful currents when it occupies the middle portion of the primary than when toward either end, as set forth in Davis's Manual of Magnetism, published in Boston; edition of 1842, page 180.

Instead of a revolving armature for a circuit-breaker, a vibrating armature may be substituted, and the latter will be found more convenient, for several reasons. One especially is, that it can be readily adjusted so as to increase or diminish the rate of interruption of the circuit and the force to be overcome in working it.

A vibrating automatic circuit-breaker, consisting of a very small electro-magnetic bar vibrating between the arms of a permanent magnet, the magnet changing its poles at each vibration, the length of vibration of the bar being regulated by a set-screw, makes a good circuit-breaker, and will be found fully described by the said CHARLES G. PAGE in Silliman's Journal, volume 32, page 355 to page 358, in a communication dated April 19, 1837. This species is, however, not so simple as others, and further allusion to it is not necessary. A vibrating armature is preferable, as it requires no change of poles to effect its motion, this being produced by merely intercepting the galvanic current at suitable intervals.

Figure 8:
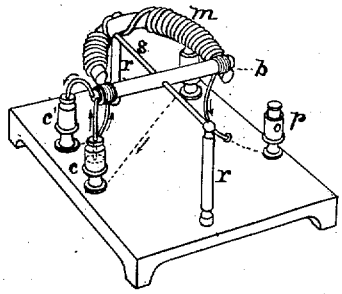

One form of vibrating armature is shown at Fig. 8. A small rod of soft iron, about the size of that shown in the figure, is mounted upon an axis or shaft, *s*, which is supported in suitable bearings upon two pillars, *r*, so as to vibrate freely. A small electro-magnet is supported upon one of these pillars, and the armature is placed between its branches, so that one end is above and the other below the plane of the magnet. One end of the armature bears a branching copper wire, its branches passing down into mercury-cups *c c'*. Cup *c* may be partly of glass, so that the play of the end of the branch wire in and out of the mercury in the cup may be seen and the sparks produced on breaking the circuit rendered visible. When the magnet is charged the armature is attracted toward its poles, and around the ends of the armature is a ferrule of thin brass or non-magnetic metal, to prevent magnetic adhesion of the armature to the magnet.

The galvanic connections are under the base-board, and may be traced as follows: One pole of the battery being connected with cup *p*, and the other with cup *n*, the current will pass along from cup *p* to cup *c*, as indicated by the arrow, thence upward through one branch of the wire, and downward through the other branch into cup *c*, thence upward again into one end of the wire around the electro-magnet, and, circulating around the wire coil, will pass out through the other end to cup *n*, and so back to the battery. The passage of the current charges the magnet, lifts one end of the armature, raises the branch wire from the mercury in the cups *c c'*, and breaks the circuit. This end then falls by its weight, the branch wire overbalancing the other end, the circuit is again completed, and thus it may be broken with great rapidity.

An adjusting or set screw may be placed on a suitable support over this end, after the manner of the last-named vibrating circuit-breaker, so as to regulate the extent of the vibrations. The weight of this end, or what may be denominated its "retractible force," may also be regulated by a small movable weight placed on or over this half of the armature, after the manner shown in Fig. 10. This circuit-breaker is introduced into the circuit of the primary coil in the same way as the revolving armature.

Figure 9:
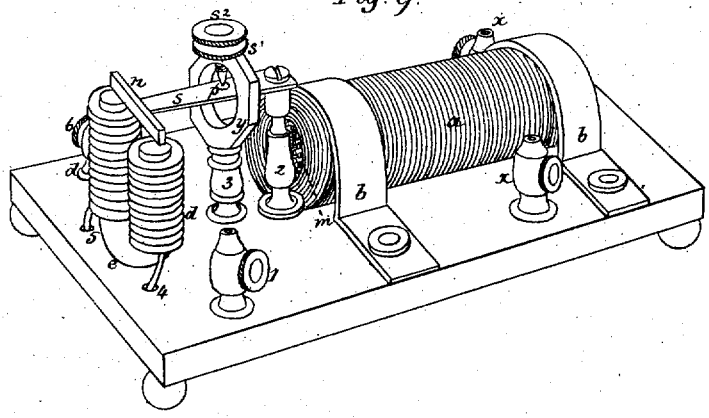

A more simple form of vibrating armature is shown in Fig. 9, in which the armature *n* vibrates to and from the electro-magnet *u u* in a direction parallel to itself. It is attached to a light brass spring, *s*, fastened to pillar 2. This spring passes through an opening in the yoke *y* on the top of pillar 3. At *p* is a tip or small disk of platinum, soldered to the spring, which is in contact with the platinum point on the lower end of set-screw $s^2$, passing down through the top of the yoke. Set-screw $s^2$ is accompanied with a tightening-nut, *s'*. This set-screw regulates the proximity of the armature to the magnet, and, to some extent, the tension of the spring and the rapidity of its vibrations.

It will be seen, however, that the regulation or adjustment is imperfect, for as the spring is pressed down toward the magnet the armature is brought nearer to the magnet, and as the attractive force increases more rapidly with the diminution of the distance between the armature and the magnet than does the force of the spring increase, the adjustment is, in a measure, defective.

If, now, the magnet *d d* be connected with the battery and charged, and the circuit with the battery is made by the current passing up pillar 2, thence into spring *s*, thence into set-screw $s^2$ and pillar 3, and thence through the wires of the electro-magnet back to the battery, the magnet will draw down the armature, and with it spring *s*, and thus break the circuit by pulling the platinum disk away from the platinum point on the lower end of set-screw $s^2$. On breaking the circuit the magnet loses its power and the spring rises and completes the circuit again, the magnet is again charged, and the armature drawn down and breaks the circuit again, and thus a very rapid series of vibrations and interruptions of the circuit may be effected. It is evident, therefore, if the circuit of this breaker be included in or form a part of the main circuit which passes through the primary coil, that at each break an induced current will be set up in the secondary coil, as with the other circuit-breakers.

Figure 10:
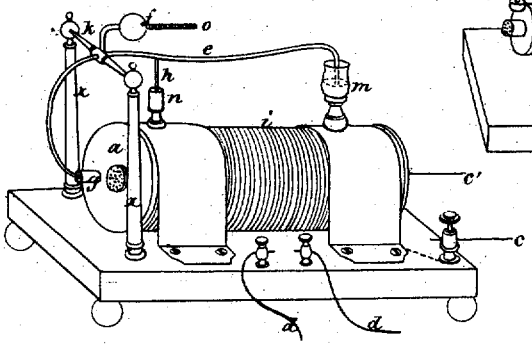

In Fig. 10 is shown an electro-magnet and armature in which the retractile force of the armature is made adjustable. This is oftentimes important. The coils *i* are secured to a base-board, and inclose a bundle of soft-iron wires. (Seen projecting slightly at *a*.)

Between the two pillars *x* is suspended the vibrating electrotome or circuit-breaker. *g* is a small cylinder of soft iron attached to one end of the lever *e*, which passes through or is otherwise secured to the vibrating shaft *k*. The other end of the lever dips into a mercury-cup, *m*, fixed upon the metallic strap *b'*. On the strap *b* is another mercury-cup, of brass, into which descends a branch wire, *h*, from the vibrating wire *e*.

Arising from the shaft *k* is a stiff brass wire, in the form of a bent lever, carrying upon its horizontal portion *o* a ball, *f*, which is movable on a screw-thread from end to end of portion *o*. It will be seen that as the ball is moved toward the extremity *o* it increases the weight of the long arm of wire *e*.

If the coils and magnet be charged by the current from the battery, and the current passes from strap *b* to *b'* through the lever *e* and mercury-cups, the magnet *a* will attract the hammer-piece *g*, and in so doing will lift the end of lever *e* out of the mercury in cup *m* and break the circuit, when the armature-lever, being drawn back by the retractile force of the weight, will again close the circuit.

As the weight *f* is further removed from the center of vibration the more magnetic power will be required to move the hammer *g*. Its distance from magnet *a* remaining the same, the greater is its retractile force, and the more suddenly and completely will the circuit be broken in cup *m*. The distance between *g* and *a* can be varied by slightly bending the wire *e*.

Figure 11:
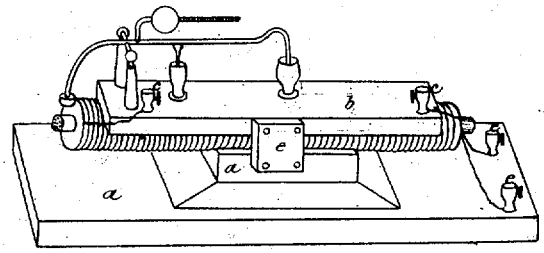

As the secondary current becomes very intense with long coils, care in insulation is necessary, and to this end the coil was formerly mounted by the said CHARLES G. PAGE on a stand of dry varnished wood, as shown in Fig. 11, where *a* is the stand, *b* a strip of baked wood varnished, to which are attached the parts of the electrotome or circuit-breaker and the cups *c c* for the terminations of the secondary circuit, the coil being secured to the stand by straps of wood instead of metal, as in Fig. 10. The cups *e e* are for the primary coil-connections, and the general management and operation of the parts are the same as in Fig. 10.

Instead of having the lever *e* to dip into mercury-cup *m*, its end may be tipped with platinum and strike upon a platinum disk soldered to strap *b'*, Fig. 10; or the arrangement may be like that of circuit-breaker, Fig. 9, substituting the armature *g*, Fig. 10, for the armature *n* on the end of spring *s*, Fig. 9, and the end of wire magnet *a*, Fig. 10, for the little electro-magnet *d d*, Fig. 9.

Figure 12:
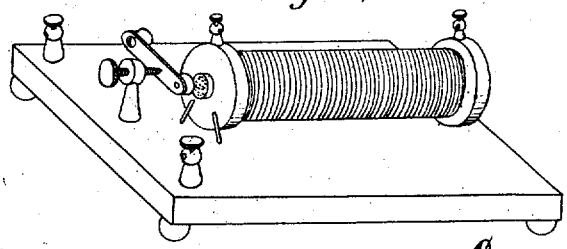

The only other change would be in the position of springs *s* and the pillars 2 3, so as to allow the armature *g* to vibrate horizontally to and from the end of the magnet. This is all shown in Fig. 12, which, with the foregoing description, needs no further explanation or illustration, the drawings plainly showing the change of position of the parts.

The spark-arresting circuit-breakers may all be used as independent or detached circuit-breakers, and these, and likewise all the independent electro-magnetic instruments hitherto used and described by me, for opening and closing circuits, with other instruments, may be operated by batteries separate and independent from the batteries which operate the circuits to be opened and closed. In fact, this often becomes necessary when the circuits of the two instruments are largely disproportioned in length. In using, for instance, the electro-magnetic circuit-breaker called "Barlow's spur-wheel," described by said PAGE in volume 31, page 141, of Silliman's Journal, it becomes much more efficient when used with a separate battery.

Having described the invention of said CHARLES G. PAGE, what I claim therein is—

1. An induction-coil apparatus, consisting of a primary and secondary circuit, when said secondary circuit is many times—that is to say, two, three, or more times—the length of the primary circuit, having the connections so arranged that shocks, sparks, and electrostatic results may be obtained from the secondary circuit alone, or from the combined primary and secondary circuits, or from the primary alone, or from portions of either circuit, substantially as set forth.

2. The combination of an automatic circuit-breaker with either a primary coil alone, or a primary and secondary coil combined, substantially as set forth.

3. The combination of a mechanical circuit-breaker with a primary and secondary coil combined, substantially as set forth.

4. The combination of both a mechanical and automatic circuit-breaker with a primary and secondary coil combined, substantially as set forth.

5. The combination of a primary and secondary coil inclosing an electro-magnet with an automatic circuit-breaker, substantially as set forth.

6. The combination of a primary and secondary coil, inclosing a compound or divided electro-magnet with an adjustable automatic circuit-breaker, substantially as set forth.

7. The combination of a primary and secondary coil inclosing a compound electro-magnet with an attached hammer circuit-breaker, substantially as set forth.

8. The spark-arresting circuit-breaker, whether used with a primary coil alone or a primary and secondary combined, substantially as set forth.

9. The spark-arresting circuit-breaker, whether used with a coil or coils inclosing an electro-magnet, substantially as set forth.

10. The spark-arresting circuit-breaker, whether attached to or independent of the primary or primary and secondary coils, substantially as set forth.

11. The adjustment of the retractile force of an automatic circuit-breaker, substantially as set forth.

12. The combination of an electro-magnet, armature, and adjustable retractor.

13. Adjusting or regulating the length of vibration of the armature of an electro-magnet by means of a set-screw or any mechanical equivalent for substantially the same purpose, substantially as herein set forth.

14. The employment of one electro-magnetic instrument to open and close the circuit of another electro-magnetic instrument, using either one battery for both or separate batteries for each, substantially as set forth.

15. The employment of separate and independent batteries to operate an eletro-magnetic circuit-breaker and the circuit which is broken by it, substantially as set forth.

In testimony whereof I have signed my name to this specification before two subscribing witnesses.

PRISCILLA WEBSTER PAGE,
*Administratrix, &c.*

Witnesses:
A. POLLOK,
C. B. NOTTINGHAM.